United States Patent [19]

Shikunami

[11] Patent Number: 5,592,451
[45] Date of Patent: Jan. 7, 1997

[54] TEST-WRITING CONTROLLING METHOD FOR OPTICAL DISK RECORDING DEVICE

[75] Inventor: Juichi Shikunami, Kanagawa-ken, Japan

[73] Assignee: Victor Company of Japan, Ltd., Yokohama, Japan

[21] Appl. No.: 490,884

[22] Filed: Jun. 15, 1995

[30] Foreign Application Priority Data

Jun. 22, 1994 [JP] Japan .................................. 6-200042

[51] Int. Cl.$^6$ .............................. G11B 3/90; G11B 27/36
[52] U.S. Cl. ................................................. 369/54; 369/58
[58] Field of Search ................................. 369/32, 58, 54, 369/275.4, 275.3, 275.1, 51, 44.26, 44.32, 47, 48, 53

[56] References Cited

U.S. PATENT DOCUMENTS

| | | | |
|---|---|---|---|
| 4,769,804 | 9/1988 | Satoh et al. | 369/58 |
| 4,969,139 | 11/1990 | Azumatani et al. | 369/58 |
| 5,483,513 | 1/1996 | Fuji | 369/58 |
| 5,513,160 | 4/1996 | Satoh et al. | 369/58 |
| 5,530,687 | 6/1996 | Yamaguchi | 369/54 |
| 5,537,381 | 7/1996 | Fuji | 369/54 |

FOREIGN PATENT DOCUMENTS

5933632  8/1991  Japan .
5303746  11/1993  Japan .

*Primary Examiner*—Tan Dinh
*Attorney, Agent, or Firm*—Pollock, Vande Sande & Priddy

[57] ABSTRACT

A test signal is recorded on a first recording disk according to a constant linear velocity technique. The test signal is reproduced from the first recording disk. A quality of the reproduced test signal is evaluated as a function of a position on the first recording disk. An information signal is recorded on a second recording disk having first and second areas. A degree of deterioration in record quality in the first area is greater than a degree of deterioration in record quality in the second area. A recording density in the recording of the information signal on the first area is decreased below a recording density in the recording of the information signal on the second area. A degree of the decrease in the recording density is changed as a function of a position on the second recording disk in response to the evaluated quality.

10 Claims, 4 Drawing Sheets

TEST-WRITING CONTROLLING METHOD FOR OPTICAL DISK RECORDING DEVICE

BACKGROUND OF THE INVENTION

1. Field of the Invention

This invention relates to a method of recording an information signal on a disk-shaped recording medium. This invention also relates to an apparatus for recording an information signal on a disk-shaped recording medium. Furthermore, this invention relates to a disk-shaped recording medium such as an optical disk or a magneto-optical disk.

2. Description of the Prior Art

Japanese published examined patent application 3-52148 discloses a system for recording an information signal on a disk-shaped recording medium. In the system of Japanese application 3-52148, the recording medium has a coat of photosensitive material, and a laser light beam modulated in accordance with the information signal is focused into a spot on the recording medium. The light-reflective characteristics of the light-spot receiving fraction of the recording medium change in response to the present time segment of the information signal. This means the recording of the present time segment of the information signal on the fraction of the recording medium.

In the system of Japanese application 3-52148, during the recording of the information signal, the recording medium is rotated about its center while being exposed to the light spot. At the same time, the center of the recording medium is linearly moved relative to the position of the light spot along a direction such that the light spot will move radially with respect to the recording medium. As a result, the recording medium is scanned by the light spot along a spiral line. The spiral line corresponds to a spiral track along which the information signal is recorded. The spiral recording track may be replaced by an array of concentric circles of recording tracks.

In the system of Japanese application 3-52148, during the recording of the information signal on an inner region of the recording medium, the rotation of the recording medium is controlled so that the light spot will continue to move relative to the recording medium at a constant linear velocity. On the other hand, during the recording of the information signal on an outer region of the recording medium, the recording medium remains rotated at a constant angular velocity. The boundary between the inner region and the outer region of the recording medium is chosen to correspond to a given radius of curvature of the recording track.

Japanese published unexamined patent application 5-303746 discloses a disk-shaped recording medium which has a spiral recording track. In one example of the recording medium disclosed by Japanese application 5-303746, the pitch between neighboring track segments decreases as a fractional region including the track segments radially moves toward an outer edge of the recording medium. In another example of the recording medium disclosed by Japanese application 5-303746, the pitch between neighboring track segments decreases and then increases as a fractional region including the track segments radially moves toward an outer edge of the recording medium.

Generally, the performances of the recording and reproduction of an information signal on and from an outer portion of a disk-shaped recording medium tend to be lowered by various factors such as a swing of a disk plane or an eccentricity of a center hole of the recording medium.

SUMMARY OF THE INVENTION

It is a first object of this invention to provide an improved method of recording an information signal on a disk-shaped recording medium.

It is a second object of this invention to provide an improved apparatus for recording an information signal on a disk-shaped recording medium.

It is a third object of this invention to provide an improved disk-shaped recording medium.

A first aspect of this invention provides a method comprising the steps of recording a test signal on a first recording disk according to a constant linear velocity technique; reproducing the test signal from the first recording disk; evaluating a quality of the reproduced test signal as a function of a position on the first recording disk; recording an information signal on a second recording disk having first and second areas, wherein a degree of deterioration in record quality in the first area is greater than a degree of deterioration in record quality in the second area; decreasing a recording density in the recording of the information signal on the first area below a recording density in the recording of the information signal on the second area; and changing a degree of sad decreasing the recording density as a function of a position on the second recording disk in response to the evaluated quality.

A second aspect of this invention provides a method comprising the steps of recording a test signal on a recording area of a first recording disk according to a constant linear velocity technique; reproducing the test signal from the recording area of the first recording disk; evaluating a quality of the reproduced test signal as a function of a radial position on the first recording disk; recording an information signal on a recording area of a second recording disk having an inner portion and an outer portion, wherein a degree of deterioration in record quality in the outer portion is greater than a degree of deterioration in record quality in the inner portion, and wherein the inner portion occupies about 80% of a radial dimension of the recording area while the outer portion occupies about 20% of the radial dimension of the recording area; executing the recording of the information signal on the inner portion according to a constant linear velocity technique during the recording of the information signal on the recording area of the second recording disk; decreasing a recording density in the recording of the information signal on the outer portion below a recording density in the recording of the information signal on the inner portion; and changing a degree of said decreasing the recording density as a function of a position on the second recording disk in response to the evaluated quality.

A third aspect of this invention provides a method comprising the steps of recording a test signal on a first recording disk according to a constant linear velocity technique; reproducing the test signal from the first recording disk; evaluating a quality of the reproduced test signal as a function of a position on the first recording disk; recording an information signal on a second recording disk having first and second areas, wherein a degree of deterioration in record quality in the first area is greater than a degree of deterioration in record quality in the second area; executing the recording of the information signal on the first area according to a constant angular velocity technique during the recording of the information signal on the second recording disk; decreasing a recording density in the recording of the information signal on the first area below a recording density in the recording of the information signal on the second area; and changing a degree of said decreasing the recording density as a function of a position on the second recording disk in response to the evaluated quality.

A fourth aspect of this invention provides a disk-shaped information recording medium on which an information signal is recorded by a method comprising the steps of: recording a test signal on a first recording disk according to a constant linear velocity technique; reproducing the test signal from the first recording disk; evaluating a quality of the reproduced test signal as a function of a position on the first recording disk; recording an information signal on a second recording disk having first and second areas, wherein a degree of deterioration in record quality in the first area is greater than a degree of deterioration in record quality in the second area; decreasing a recording density in the recording of the information signal on the first area below a recording density in the recording of the information signal on the second area; and changing a degree of said decreasing the recording density as a function of a position on the second recording disk in response to the evaluated quality.

A fifth aspect of this invention provides a disk-shaped information recording medium on which an information signal is recorded by a method comprising the steps of: recording a test signal on a recording area of a first recording disk according to a constant linear velocity technique; reproducing the test signal from the recording area of the first recording disk; evaluating a quality of the reproduced test signal as a function of a radial position on the first recording disk; recording an information signal on a recording area of a second recording disk having an inner portion and an outer portion, wherein a degree of deterioration in record quality in the outer portion is greater than a degree of deterioration in record quality in the inner portion, and wherein the inner portion occupies about 80% of a radial dimension of the recording area while the outer portion occupies about 20% of the radial dimension of the recording area; executing the recording of the information signal on the inner portion according to a constant linear velocity technique during the recording of the information signal on the recording area of the second recording disk; decreasing a recording density in the recording of the information signal on the outer portion below a recording density in the recording of the information signal on the inner portion; and changing a degree of said decreasing the recording density as a function of a position on the second recording disk in response to the evaluated quality, A sixth aspect of this invention provides a method comprising the steps of recording a test signal on a first recording disk according to a constant linear velocity technique; reproducing the test signal from the first recording disk; generating a tracking signal related to the first recording disk during the reproduction of the test signal from the first recording disk; evaluating a quality of the generated tracking signal as a function of a position on the first recording disk; recording an information signal on a second recording disk having first and second areas, wherein a degree of deterioration in record quality in the first area is greater than a degree of deterioration in record quality in the second area; decreasing a recording density in the recording of the information signal on the first area below a recording density in the recording of the information signal on the second area; and changing a degree of said decreasing the recording density as a function of a position on the second recording disk in response to the evaluated quality, A seventh aspect of this invention provides a method comprising the steps of recording a test signal on a recording area of a first recording disk according to a constant linear velocity technique; reproducing the test signal from the recording area of the first recording disk; generating a tracking signal related to the recording area of the first recording disk during the reproduction of the test signal from the recording area of the first recording disk; evaluating a quality of the generating tracking as a function of a radial position on the first recording disk; recording an information signal on a recording area of a second recording disk having an inner portion and an outer portion, wherein a degree of deterioration in record quality in the outer portion is greater than a degree of deterioration in record quality in the inner portion, and wherein the inner portion occupies about 80% of a radial dimension of the recording area while the outer portion occupies about 20% of the radial dimension of the recording area; executing the recording of the information signal on the inner portion according to a constant linear velocity technique during the recording of the information signal on the recording area of the second recording disk; decreasing a recording density in the recording of the information signal on the outer portion below a recording density in the recording of the information signal on the inner portion; and changing a degree of said decreasing the recording density as a function of a position on the second recording disk in response to the evaluated quality.

An eighth aspect of this invention provides a method comprising the steps of recording a test signal on a first recording disk according to a constant linear velocity technique; reproducing the test signal from the first recording disk; generating a tracking signal related to the first recording disk during the reproduction of the test signal from the first recording disk; evaluating a quality of the generated tracking signal as a function of a position on the first recording disk; recording an information signal on a second recording disk having first and second areas, wherein a degree of deterioration in record quality in the first area is greater than a degree of deterioration in record quality in the second area; executing the recording of the information signal on the first area according to a constant angular velocity technique during the recording of the information signal on the second recording disk; decreasing a recording density in the recording of the information signal on the first area below a recording density in the recording of the information signal on the second area; and changing a degree of said decreasing the recording density as a function of a position on the second recording disk in response to the evaluated quality.

A ninth aspect of this invention provides an apparatus comprising means for recording a test signal on a first recording disk according to a constant linear velocity technique; means for reproducing the test signal from the first recording disk; means for detecting a quality of the reproduced test signal as a function of a position on the first recording disk; means for recording an information signal on a second recording disk at an adjustable linear velocity; and means for controlling the adjustable linear velocity as a function of a position on the second recording disk in response to the evaluated quality during the recording of the information signal on the second recording disk.

A tenth aspect of this invention provides an apparatus comprising means for recording a test signal on a first recording disk according to a constant linear velocity technique; means for reproducing the test signal from the first recording disk; means for evaluating a quality of the reproduced test signal as a function of a position on the first recording disk; means for recording an information signal on a second recording disk having first and second areas, wherein a degree of deterioration in record quality in the first area is greater than a degree of deterioration in record quality in the second area; means for decreasing a recording density in the recording of the information signal on the first area below a recording density in the recording of the information signal on the second area; and means for changing a degree of said decreasing the recording density as a function of a position on the second recording disk in response to the evaluated quality.

DESCRIPTION OF THE PREFERRED EMBODIMENTS

Figure 1:
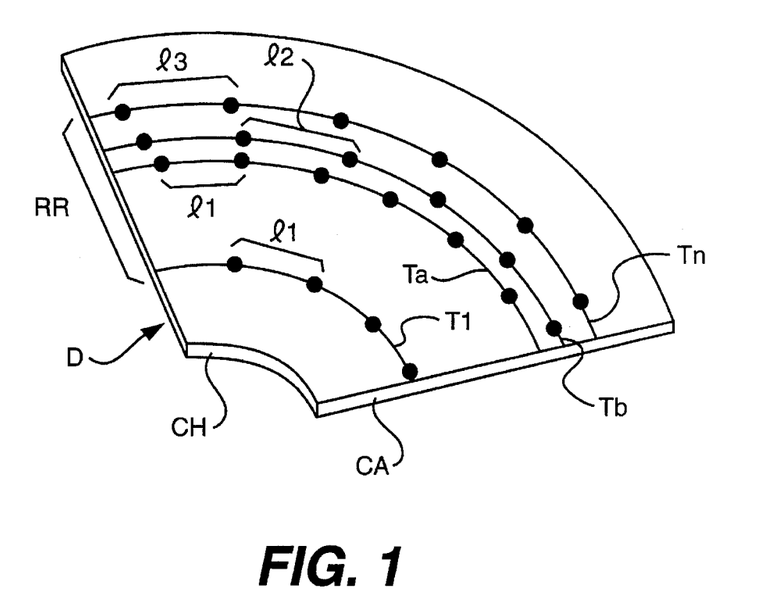
FIG. 1 is a perspective diagram of a part of an optical disk in an embodiment of this invention.

With reference to FIG. 1, an optical disk D has a hole CH at its center. The hole CH is referred to as the center hole. The optical disk D has an annular clamping area CA extending concentrically outward of the center hole CH. The optical disk D has an annular recording region RR extending concentrically outward of the clamping area CA.

The recording region RR is formed with a spiral recording track. An innermost track segment (An innermost turn of the track) T1 extends along the inner edge of the recording region RR. An outermost track segment (An outermost turn of the track) Tn extends along the outer edge of the recording region RR. In FIG. 1, the characters Ta and Tb denote two of intermediate track segments between the innermost track segment T1 and the outermost track segment Tn. The intermediate track segments Ta and Tb are closer to the outermost track segment Tn than the innermost track segment T1. The intermediate track segment Ta is located between the innermost track segment T1 and the intermediate track segment Tb.

Alternatively, the recording region RR may be formed with an array of concentric circles of recording tracks.

In FIG. 1, the black dots on the curved lines represent a spatial period of the recorded state of an information signal. In the case where the information signal agrees with digital data, the black dots denote the boundaries between data blocks. In another case, the black dots denote positions in the optical disk D at which sync components of an information signal are recorded.

In FIG. 1, the characters l1, l2, and l3 denote lengths along the recording track which correspond to the previously-indicated spatial period of the recorded state of the information signal. Specifically, the period lengths l1, l2, and l3 are defined between the adjacent black dots along the recording track. The period length l1 along the innermost track segment T1 or the first intermediate track segment Ta is smaller than the period length l2 along the second intermediate track segment Tb and the period length l3 along the outermost track segment Tn. According to this arrangement, a recording linear density related to the recording track in an outer region of the optical disk D is smaller than recording linear densities related to the recording track in inner and intermediate regions of the optical disk D.

Figure 2:
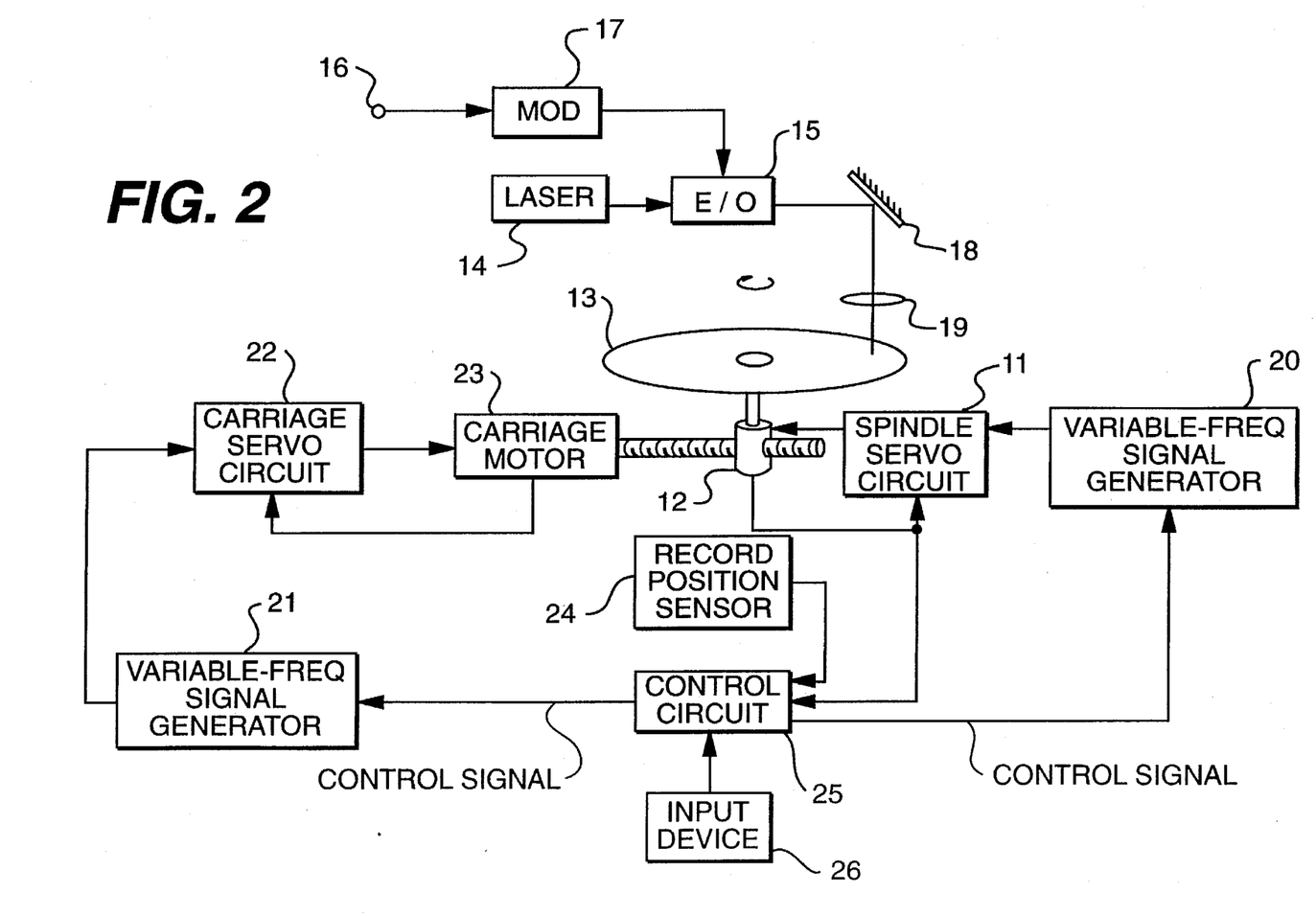
FIG. 2 is a block diagram of a cutting machine in the embodiment of this invention.

FIG. 2 shows a cutting machine for recording an information signal on an optical disk (not shown in the drawing) which can be used as an original disk or a production optical disk. With reference to FIG. 2, the cutting machine includes a laser 14 emitting a light beam toward an E/O (electrical-to-optical) converter 15. The light beam enters the E/O converter 15. An input information signal to be recorded is applied to a modulator 17, being converted thereby into a binary information signal (a bi-level signal) suited for record on the optical disk. The modulator 17 outputs the binary information signal to the E/O converter 15.

The E/O converter 15 selectively transmits and blocks the light beam in response to the binary information signal. Accordingly, the light beam outputted from the E/O converter 15 is modulated in accordance with the binary information signal. The light beam is propagated from the E/O converter 15 to a fixed mirror 18 before being reflected thereby toward a condenser lens 19 within a recording head (a write head). The light beam enters the condenser lens 19. The light beam is focused by the condenser lens 19 into a spot on the optical disk concentrically supported on a turn table 13.

The light-reflective characteristics of the light-spot receiving fraction of the optical disk change in response to the present time segment of the binary information signal. This means the recording of the present time segment of the binary information signal on the fraction of the optical disk.

A spindle servo circuit 11 outputs a drive signal to a spindle motor 12. The spindle motor 12 rotates the turn table 13 about its center in response to the drive signal outputted from the spindle servo circuit 11. The spindle motor 12 is provided with a sensor which detects rotating conditions of the spindle motor 12. The sensor output signal representing the rotating conditions of the spindle motor 12 is fed to the spindle servo circuit 11. The drive signal to the spindle motor 12 depends on the sensor output signal. Accordingly, the spindle motor 12 is subjected to feedback control. Specifically, the spindle servo circuit 11 generates the drive signal in response to the output signal of a first variable-frequency signal generator 20 and the sensor output signal.

A carriage servo circuit 22 outputs a drive signal to a carriage motor 23. The output shaft of the carriage motor 23 is coupled with a carriage mechanism for linearly moving the center of the turn table 13 relative to the position of the light spot on the optical disk. Specifically, the carriage mechanism serves to vary the distance between the center of the optical disk and the position of the light spot. The carriage motor 23 drives the carriage mechanism, thereby varying the distance between the center of the optical disk and the position of the light spot. The carriage motor 23 is provided with a sensor which detects rotating conditions of the carriage motor 23. The sensor output signal representing the rotating conditions of the carriage motor 23 is fed to the carriage servo circuit 22. The drive signal to the carriage motor 23 depends on the sensor output signal. Accordingly, the carriage motor 23 is subjected to feedback control. Specifically, the carriage servo circuit 22 generates the drive signal in response to the output signal of a second variable-frequency signal generator 21 and the sensor output signal.

A recording position sensor 24 associated with the turn table 13 detects a position related to linear movement of the turn table 13 which is referred to as a linear scale. Specifically, the recording position sensor 24 detects the position of the center of the optical disk relative to the position of the light spot on the optical disk. In other words, the recording position sensor 24 detects the position of the light spot relative to the center of the optical disk or the radial distance between the position of the light spot and the center of the optical disk. The recording position sensor 24 outputs a signal representing the detected positional information or the detected distance information.

A control circuit 25 receives the output signal from the recording position sensor 24. The control circuit 25 receives the output signal of the sensor within the spindle motor 12. The output signal of the sensor within the spindle motor 12 represents the rotational speed of the optical disk. The control circuit 25 receives information from an input device 26 including a keyboard or a floppy disk drive. The control circuit 25 generates control signals in response to the received signals and the received information, and output the generated control signals to the first and second variable-frequency signal generators 20 and 21 respectively.

The control circuit 25 includes a microcomputer, a digital signal processor, or a similar device which has a combination of a CPU, a RAM, a ROM, and an interface unit. The control circuit 25 operates in accordance with a program stored in the ROM.

The first variable-frequency signal generator 20 adjusts the frequency of the output signal to the spindle servo circuit 11 in response to the control signal fed from the control circuit 25. Accordingly, the spindle motor 12 is controlled in response to the control signal generated by the control circuit 25, and the rotation of the optical disk is adjusted in response to the control signal generated by the control circuit 25. The second variable-frequency signal generator 21 adjusts the frequency of the output signal to the carriage servo circuit 22 in response to the control signal fed from the control circuit 25. Accordingly, the carriage motor 23 is controlled in response to the control signal generated by the control circuit 25, and the linear movement of the optical disk relative to the light spot is adjusted in response to the control signal generated by the control circuit 25.

The control of the spindle motor 12 and the carriage motor 23 is designed so that the optical disk is rotated about its center while the center of the optical disk is linearly moved relative to the position of the light spot on the optical disk. Therefore, the recording region RR of the optical disk is scanned by the light spot along, for example, a spiral line. The spiral line corresponds to a spiral track along which the binary information signal is recorded. The spiral recording track may be replaced by an array of concentric circles of recording tracks.

Experiments were performed as follows. An information signal was recorded on an exclusive playback optical disk at a recording density equal to four times the recording density in a normal compact disk (CD). The resultant optical disk was subjected to a playback process by a player (not shown). During the playback process, birefringence at a surface of the optical disk with respect to a light beam was observed and measured while the radial distance between the center of the optical disk and the position of a spot of the light beam on the optical disk was varied. The degree of birefringence was expressed by a distance corresponding to an advance or a retardation of the wavefront of the light beam.

Figure 3:
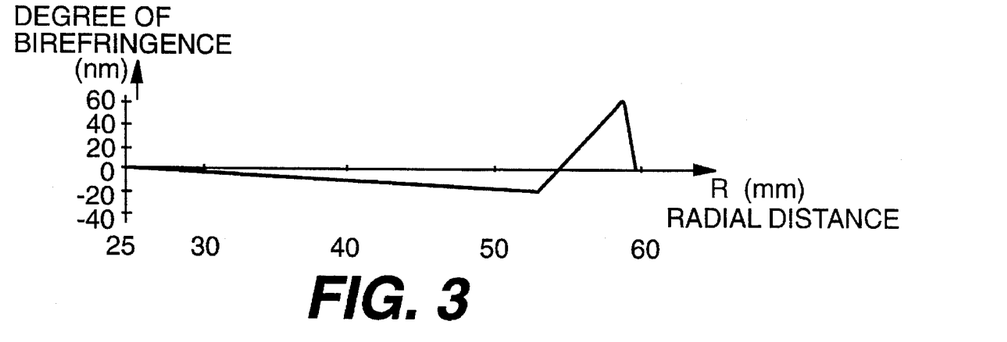
FIG. 3 is a diagram of the relation between the degree of birefringence and a radial distance in an optical disk.

FIG. 3 shows the experimentally provided relation between the degree of birefringence and the radial distance R between the center of the optical disk and the position of the light spot. In the case of a normal CD, an annular recording region corresponds to the radial distance R in the range of 25 mm (or 23 mm) to 58 mm. Accordingly, in FIG. 3, the radial distance R was varied between 25 mm (or 23 mm) and 58 mm. The degree of birefringence was denoted by a mean value for every rotation of the optical disk.

As shown in FIG. 3, the degree of birefringence was equal to 40 nm or more and thus corresponded to a considerable deterioration when the radial distance R was in the range of 56 mm to 58 mm. The degree of birefringence peaked to 60 nm. The light beam had a wavelength of 670 nm. Generally, during the reproduction of a signal from an optical disk by an optical pickup head within a player, the degree of birefringence causes a deterioration in the amplitude of the reproduced signal as expressed by the following equation.

$$L=\cos^2(\pi \cdot B/\lambda) \tag{1}$$

where L denotes the deterioration, and B denotes the birefringence degree (nm) and $\lambda$ denotes the light wavelength. In the case where the light wavelength was equal to 670 nm and the birefringence degree was equal to 60 nm (the peak value in FIG. 3), the deterioration L was equal to 0.92 according to the equation (1). Thus, the amplitude of the reproduced signal was deteriorated by a factor of 0.92 in comparison with a normally-available amplitude.

The following fact was experimentally confirmed. In order to compensate for the amplitude deterioration in a tracing direction (that is, a recording linear density direction or a track linear direction), it was good to decrease the track linear density (the recording linear density) by a factor of 0.92 as compared with an original density. Accordingly, the decreased track linear density was equal to 0.92 times the original density.

Figure 4:
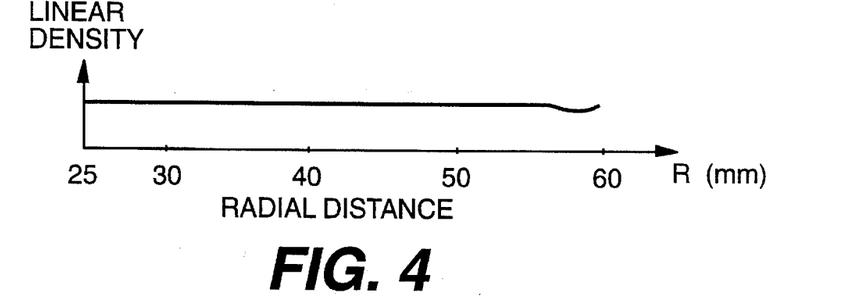
FIG. 4 is a diagram of the relation between a recording linear density and a radial distance in an optical disk.

In view of the results of the previously-indicated experiments, it is preferable that the recording density of a region of an optical disk which corresponds to the radial distance R in the range of 56 mm to 58 mm is lower than the recording density of other regions of the optical disk. FIG. 4 shows an example of such an uneven distribution of the recording linear density. Preferably, the relation between the decrease in the track linear density and the deterioration in the amplitude is chosen to depend on the recording density of the optical disk and the operating characteristics of the optical pickup head.

Figure 5:
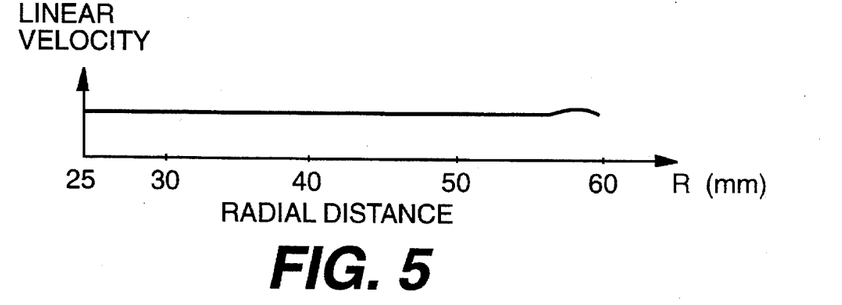
FIG. 5 is a diagram of the relation between a linear velocity and a radial distance with regard to an optical disk.
Figure 6:
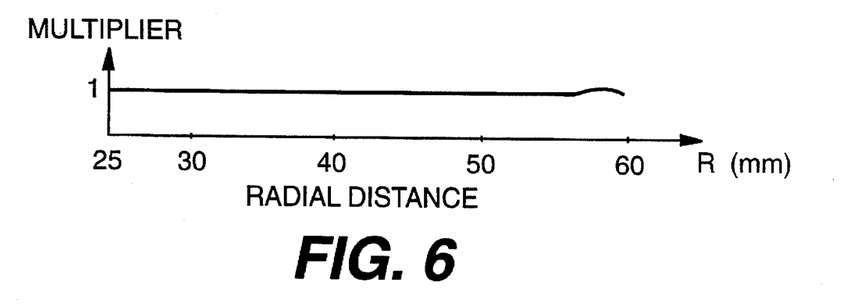
FIG. 6 is a diagram of a multiplier and a radial distance in an optical disk in the embodiment of this invention.

In order to provide the uneven distribution of the recording linear density (FIG. 4), a linear velocity is varied in accordance with the radial distance R as shown in FIG. 5. The linear velocity means a relative speed between the optical disk and the light spot along a line or a track. Actually, in order to provide the uneven distribution of the recording linear density (FIG. 4), the rotational speed of the spindle motor 12 and the rotational speed of the carriage motor 23 are corrected in accordance with the radial distance R by referring to a multiplier (a corrective coefficient) which depends on the radial distance R as shown in FIG. 6.

Figure 7:
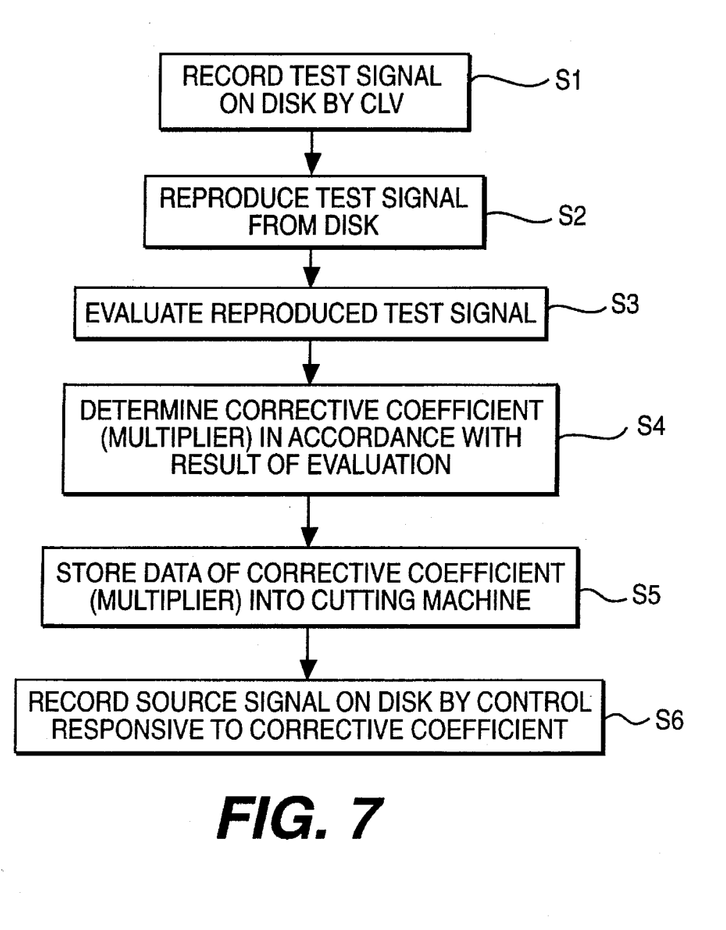
FIG. 7 is a flow diagram of a sequence of processes executed in the embodiment of this invention.

With reference to FIG. 7, during a first step S1, a test information signal is recorded on a test optical disk by the cutting machine of FIG. 2. Specifically, the recording of the test information signal is executed according to a CLV (constant linear velocity) technique. Accordingly, during the recording of the test information signal, a light spot continues to rotate relative to the test optical disk at a constant linear velocity. Thus, a recording linear density of the resultant test optical disk is independent of the radial distance R (the distance between the center of the test optical disk and the position of a light spot).

During a step S2 following the step S1, a player (not shown) subjects the test optical disk to a playback process so that the test information signal is reproduced from the test optical disk.

During a step S3 subsequent to the step S2, by using a suitable device, the amplitude of the reproduced test information signal is detected in connection with the radial distance R to evaluate the quality of the reproduced test information signal. Data is generated which represents the relation between the amplitude of the reproduced test information signal and the radial distance R. The generated data is stored into a memory. In evaluating the quality of the reproduced test information signal, jitter components of the reproduced test information signal may be detected instead of the amplitude thereof. The quality of a tracking signal (or the qualities of tracking signals) generated during the reproduction of the test information signal may be evaluated in addition to the evaluation of the quality of the reproduced test information signal. The evaluation of the quality of the reproduced test information signal may be replaced by the evaluation of the quality of the tracking signal.

During a step S4 following the step S3, by using a suitable device, a multiplier (a corrective coefficient) depending on the radial distance R is determined in response to the result of the evaluation of the quality of the reproduced test information signal which is given in the step S3. The determined multiplier is designed to compensate for the previously-indicated deterioration of a reproduced information signal. Specifically, the determined multiplier is designed to provide an uneven distribution of the recording linear density such as shown in FIG. 4. FIG. 6 shows an example of the relation between the determined multiplier and the radial distance R which enables the uneven distribution of the recording linear density. According to the example shown in FIG. 6, the multiplier (the corrective coefficient) remains 1 when the radial distance R varies in the range of 25 mm (or 23 mm) to 56 mm. In addition, the multiplier (the corrective coefficient) increases from 1 and than decreases toward 1 as the radial distance R increases from 56 mm to 58 mm. In this way, data is generated which represents the relation between the multiplier (the corrective coefficient) and the radial distance R.

During a step S5 subsequent to the step S4, the data representing the relation between the multiplier (the corrective coefficient) and the radial distance R is stored via the input device 26 into the RAM within the control circuit 25 of the cutting machine of FIG. 2.

The steps S1–S5 provide preliminary operation which is followed by the recording of a source information signal on a production optical disk.

During a step S6 following the step S5, a source information signal is recorded on a production optical disk by the cutting machine of FIG. 2. During the recording of the source information signal, the spindle motor 12 and the carriage motor 23 are controlled in response to the multiplier (the corrective coefficient) and the radial distance R by referring to the data representing the relation between the multiplier (the corrective coefficient) and the radial distance R. According to the example shown in FIG. 6, the multiplier (the corrective coefficient) remains 1 and hence the recording of the source information signal keeps executed in a CLV (constant linear velocity) technique when the radial distance R varies in the range of 25 mm (or 23 mm) to 56 mm. On the other hand, the multiplier (the corrective coefficient) varies above 1 and thus the recording of the source information signal moves out of the CLV control when the radial distance R increases from 56 mm to 58 mm. Accordingly, the recording linear density is decreased from the normal value when the radial distance R is in the range of 56 mm to 58 mm.

As previously described, the control circuit 25 within the cutting machine of FIG. 2 operates in accordance with a program stored in the internal ROM. The program includes a main routine, and first and second sub routines. The main routine has a block for selecting one of the first and second sub routines in response to a selection signal fed via the input device 26. The first sub routine is designed to enable the operation of the cutting machine which occurs during the step S1. The second sub routine is designed to enable the operation of the cutting machine which occurs during the step S6.

The first sub routine has a known sequence of blocks for implementing CLV control. In the first sub routine, the block sequence is periodically reiterated.

The second sub routine has a sequence of blocks which is periodically reiterated. Specifically, a first block in the second sub routine derives the current value of the radial distance R from the output signal of the recording position sensor 24. A second block following the first block calculates or determines a value of the multiplier in response to the current value of the radial distance R by referring to the data representing the relation between the multiplier (the corrective coefficient) and the radial distance R. A third block subsequent to the second block generates control signals for the first and second variable-frequency signal generators 20 and 21 in response to the value of the multiplier, the current value of the radial distance R, and the output signal of the sensor within the spindle motor 12. A fourth block following the third block outputs the control signals to the first and second variable frequency signal generators 20 and 21. The control signals are designed so that the production optical disk can rotate and move at substantially a desired linear velocity relative to the position of the light spot which depends on the radial distance R. After the fourth block, the first block is executed again.

In order to record a source information signal on a second production optical disk, it is sufficient to execute only the step S6 by the cutting machine of FIG. 2.

According to another example, the recording region RR of the optical disk D is divided into an inner portion and an outer portion. The outer portion has a radial dimension (a radial width) equal to about 20% of the radial dimension of the recording region RR. The inner portion has a radial dimension (a radial width) equal to about 80% of the radial dimension of the recording region RR. The recording of an information signal on the inner portion of the recording region RR is executed according to a CLV (constant linear velocity) technique. The recording of the information signal on the outer portion of the recording region RR is executed in a manner different from a CLV (constant linear velocity) technique. The recording linear density in the outer portion is lower than the recording linear density in the inner portion. As suggested from FIG. 4, "20%" corresponding to the boundary between the outer portion and the inner portion is a critical value or a threshold value for providing unexpected results. The recording of the information signal on the outer portion of the recording region RR may be executed according to a CAV (constant angular velocity)

technique. In this case, a maximum value of the recording linear density in the outer portion is smaller than the recording linear density in the inner portion.

Figure 8:
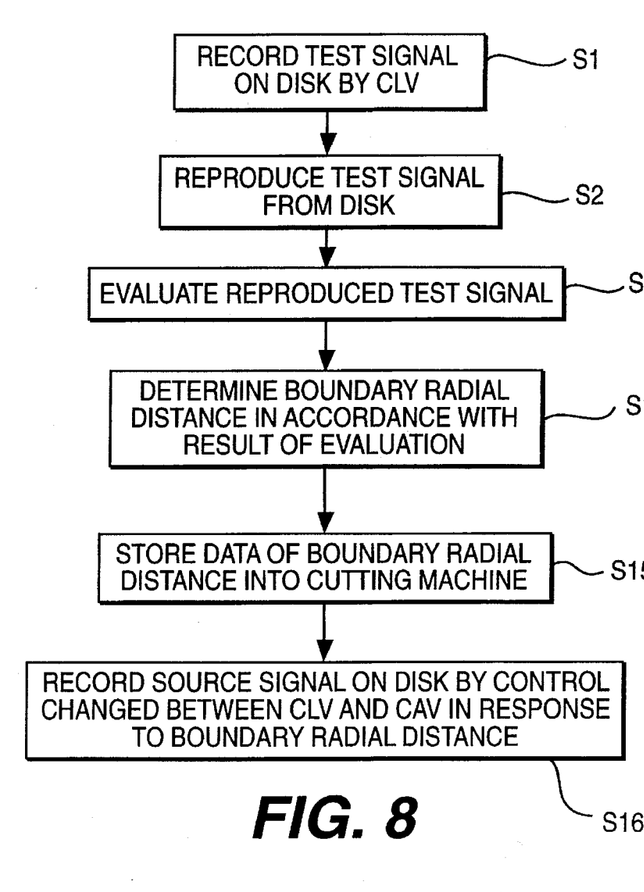
FIG. 8 is a flow diagram of a sequence of processes executed in another embodiment of this invention.

FIG. 8 shows an example which may replace the example in FIG. 7. According to the example in FIG. 8, steps S1–S3 are similar to those in FIG. 7, and the step S3 is followed by a step S14.

During the step S14, by using a suitable device, a boundary radial distance is determined in response to the result of the evaluation of the quality of the reproduced test information signal which is given in the step S3. In addition, a desired angular velocity for CAV control is determined in response to the result of the evaluation of the quality of the reproduced test information signal which is given in the step S3. The desired angular velocity for CAV control may use a predetermined constant value. In this way, data is generated which represents the boundary radial distance and the desired angular velocity for CAV control.

During a step S15 subsequent to the step S14, the data representing the boundary radial distance and the desired angular velocity for CAV control is stored via the input device 26 into the RAM within the control circuit 25 of the cutting machine of FIG. 2.

The steps S1–S3, S14, and S15 provide preliminary operation which is followed by the recording of a source information signal on a production optical disk.

During a step S16 following the step S15, a source information signal is recorded on a production optical disk by the cutting machine of FIG. 2. During the recording of the source information signal, the spindle motor 12 and the carriage motor 23 are controlled in response to the radial distance R. The data representing the boundary radial distance and the desired angular velocity for CAV is used in the control of the spindle motor 12 and the carriage motor 23. The recording of the source information signal keeps executed in a CLV (constant linear velocity) technique when the radial distance R varies in the range of 25 mm (or 23 mm) to the boundary radial distance. In other words, the recording of the source information signal on an inner portion of the recording region RR is executed according to a CLV (constant linear velocity) technique. On the other hand, the recording of the source information signal keeps executed in a CAV (constant angular velocity) technique when the radial distance R varies in the range greater than the boundary radial distance. In other words, the recording of the source information signal on an outer portion of the recording region RR is executed according to a CAV (constant angular velocity) technique. During the CAV control, the actual angular velocity is maintained substantially at the desired angular velocity.

With regard to the example shown in FIG. 8, the program for operating the control circuit 25 within the cutting machine of FIG. 2 is modified as follows. The program includes a main routine, and first and second sub routines. The main routine has a block for selecting one of the first and second sub routines in response to a selection signal fed via the input device 26. The first sub routine is designed to enable the operation of the cutting machine which occurs during the step S1. The second sub routine is designed to enable the operation of the cutting machine which occurs during the step S16.

The first sub routine has a known sequence of blocks for implementing CLV control. In the first sub routine, the block sequence is periodically reiterated.

The second sub routine has a sequence of blocks which is periodically reiterated. Specifically, a first block in the second sub routine derives the current value of the radial distance R from the output signal of the recording position sensor 24. A second block following the first block compares the current value of the radial distance R with the boundary radial distance. When the current value of the radial distance R is equal to or smaller than the boundary radial distance, a third block for implementing CLV control is executed. On the other hand, when the current value of the radial distance R is greater than the boundary radial distance, a fourth block for implementing CAV control is executed. In the fourth block, a control parameter of the CAV control is determined by the desired angular velocity. After the third and fourth blocks, the first block is executed again.

It should be noted that decreasing the recording linear density may be replaced by decreasing a track density in the radial direction. Furthermore, decreasing the recording linear density may be replaced by decreasing both the recording linear density and a track density in the radial direction.

As previously described, the recording linear density in an outer portion of the recording region RR is decreased relative to the recording linear density in an inner portion of the recording region RR. The decrease in the recording linear density in the outer portion of the recording region RR is implemented by executing, for example, CAV control. The recording region RR corresponds to the radial distance R in the range of 23 mm (or 25 mm) to 58 mm, while the outer portion of the recording region RR corresponds to the radial distance R in the range of, for example, 56 mm to 58 mm. The outer portion of the recording region RR may correspond to the radial distance R in the range of 53 mm to 58 mm, in the range of 54 mm to 58 mm, or in the range of 55 mm to 58 mm.

Figure 9:
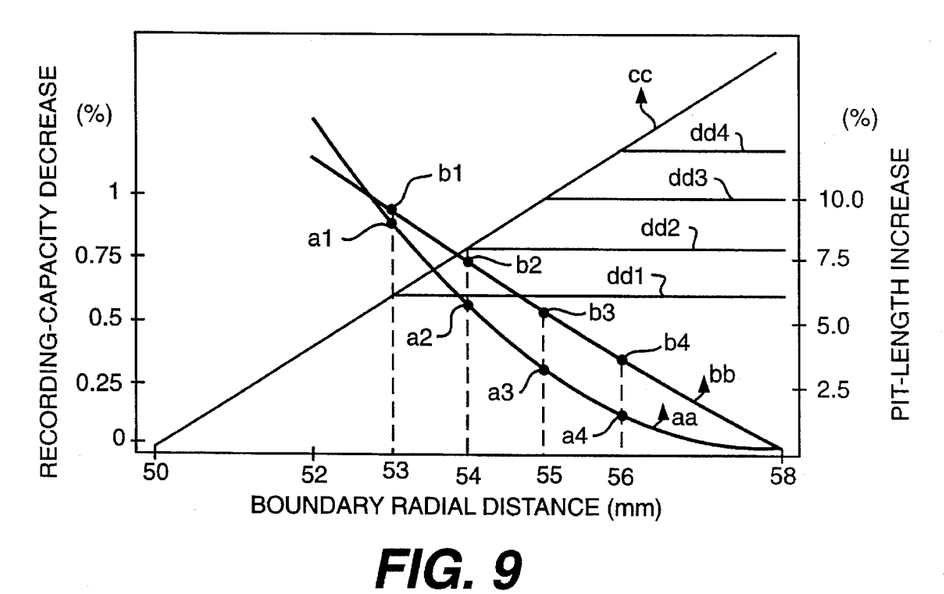
FIG. 9 is a diagram of the relation among a recording-capacity decrease, a pit-length increase, an amount of recorded information per turn of a recording track, and a radial distance in optical disks.

A consideration will now be given of the case where the amount of information per turn of the recording track in the outer portion of the recording region RR is constant while the decrease in the recording linear density in the outer portion of the recording region RR is implemented by executing CAV control. In this case, the resultant decrease Drc in the recording capacity of the optical disk D relative to the recording capacity of a reference optical disk exclusive of a density-decreased area is given as follows.

$$Drc = (1/2835) \times (58-r)^2 \tag{2}$$

where "r" denotes the boundary radial distance corresponding to the boundary between the inner portion and the outer portion of the recording region RR. As denoted by the curve "aa" in FIG. 9, the recording-capacity decrease Drc varies in accordance with the boundary radial distance. In addition, the resultant increase Ip in the pit length at the outermost track segment relative to the pit length at the boundary radial distance is given as follows.

$$Ip = (58-r)/r \tag{3}$$

As denoted by the line "bb", the pit-length increase Ip varies in accordance with the boundary radial distance. It should be noted that a sequence of pits forms the recording track in the optical disk.

With reference to FIG. 9, when the boundary radial distance is equal to 53 mm, the recording-capacity decrease Drc is equal to 0.88% (the point "a1" in the drawing) while the pit-length increase Ip is equal to 9.4% (the point b1 in the drawing). When the boundary radial distance is equal to 54 mm, the recording-capacity decrease Drc is equal to 0.56% (the point "a2" in the drawing) while the pit-length increase Ip is equal to 7.4% (the point b2 in the drawing). When the boundary radial distance is equal to 55 mm, the recording-capacity decrease Drc is equal to 0.32% (the point "a3" in the drawing) while the pit-length increase Ip is equal to 5.5% (the point b3 in the drawing). When the boundary radial distance is equal to 56 mm, the recording-capacity decrease Drc is equal to 0.14% (the point "a4" in the drawing) while the pit-length increase Ip is equal to 3.6% (the point b4 in the drawing).

In the case where an information signal is recorded on the whole part of the recording region RR of an optical disk according to a CLV technique, the amount of recorded information per turn of the recording track increases in proportion to the radial distance to the related turn as denoted by the line "cc" in FIG. 9.

A consideration will now be given of the case where an information signal is recorded on an inner portion of the recording region RR of an optical disk according to a CLV technique while the information signal is recorded on an outer portion of the recording region RR according to a CAV technique. In this case, when the outer portion of the recording region RR corresponds to the radial distance in the range of 53 mm to 58 mm, the mount of recorded information per turn of the recording track remains constant in the outer portion of the recording region RR as denoted by the line "dd1" in FIG. 9. When the outer portion of the recording region RR corresponds to the radial distance in the range of 54 mm to 58 mm, the amount of recorded information per turn of the recording track remains constant in the outer portion of the recording region RR as denoted by the line "dd2" in FIG. 9. When the outer portion of the recording region RR corresponds to the radial distance in the range of 55 mm to 58 mm, the amount of recorded information per turn of the recording track remains constant in the outer portion of the recording region RR as denoted by the line "dd3" in FIG. 9. When the outer portion of the recording region RR corresponds to the radial distance in the range of 56 mm to 58 mm, the amount of recorded information per turn of the recording track remains constant in the outer portion of the recording region RR as denoted by the line "dd4" in FIG. 9.

What is claimed is:

1. A method comprising the steps of:

recording a test signal on a first recording disk according to a constant linear velocity technique;

reproducing the test signal from the first recording disk;

evaluating the reproduced test signal as a function of a recording position on said test signal on the first recording disk;

recording an information signal on a second recording disk having first and second areas, said first area having an inferior degree of deterioration in quality than the second area;

decreasing a recording density during recording of the information signal on the first area below a recording density during recording of the information signal on the second area as a function of a recording position on the second recording disk based on the evaluation of said test signal.

2. A method comprising the steps of:

recording a test signal on a recording area of a first recording disk according to a constant linear velocity technique;

reproducing the test signal from the recording area of the first recording disk;

evaluating the reproduced test signal as a function of a radial recording position of said test signal on the first recording disk;

recording an information signal on a recording area of a second recording disk having an inner portion and an outer portion, the outer portion having a degree of deterioration in record quality greater than the inner portion, and wherein the inner portion occupies substantially 80% of a radial dimension of the recording area while the outer portion occupies substantially 20% of the radial dimension of the recording area;

recording the information signal on the inner portion according to a constant linear velocity technique during the recording of the information signal on the recording area of the second recording disk;

decreasing a recording density in the recording of the information signal on the outer portion below a recording density of the information signal on the inner portion as a function of a recording position on the second recording disk in response to the evaluation of said test signal.

3. A method comprising the steps of:

recording a test signal on a first recording disk according to a constant linear velocity technique;

reproducing the test signal from the first recording disk;

evaluating the reproduced test signal as a function of a recording position of said test signal on the first recording disk;

recording an information signal on a second recording disk having a first and second areas, wherein record quality in the first area is deteriorated more than record quality in the second area;

recording the information signal on the first area according to a constant angular velocity technique during the recording of the information signal on the second recording disk;

decreasing a recording density in the recording of the information signal on the first area below a recording density of the information signal on the second area as a function of a recording position on the second recording disk in response to the evaluated test signal.

4. A disk-shaped information recording medium on which an information signal is recorded by a method comprising the steps of:

recording a test signal on a first recording disk according to a constant linear velocity technique; reproducing the test signal from the first recording disk; evaluating the reproduced test signal as a function of a recording position of said test signal on the first recording disk; recording an information signal on a second recording disk having first and second area, the first area having a greater degree of deterioration in the second area; decreasing a recording density during recording of the information signal on the first area below record density of the information signal on the second area as a function of a recording position on the second recording disk in response to the evaluated test signal.

5. A disk-shaped information recording medium on which an information signal is recorded by a method comprising the steps of:

recording a test signal on a recording area of a first recording disk according to a constant linear velocity technique; reproducing the test signal from the recording area of the first recording disk; evaluating the reproduced test signal as a function of a radial recording position of said test signal on the first recording disk; recording an information signal on a recording area of a second recording disk having an inner portion and an outer portion, the outer portion having a degree of deterioration greater than a degree of deterioration in the inner portion, and wherein the inner portion occupies substantially 80% of a radial dimension of the recording area while the outer portion occupies substantially 20% of the radial dimension of the recording area; recording the information signal on the inner portion according to a constant linear velocity technique during the recording of the information signal on the recording area of the second recording disk; decreasing a recording density on the outer portion below a recording density on the inner portion; and changing a degree of said decreasing the recording density as a function of a recording position on the second recording disk in response to the evaluated test signal.

6. A recording method comprising the steps of:

recording a test signal on a first recording disk according to a constant linear velocity technique;

reproducing the test signal from the first recording disk;

generating a tracking signal related to the first recording disk during the reproduction of the test signal from the first recording disk;

evaluating the generated tracking signal as a function of a recording position on the first recording disk;

recording an information signal on a second recording disk having a first and second areas, the first area having a greater quality deterioration than a degree of deterioration in the second area;

decreasing a recording density in the recording of the information signal on the first area below a recording density in the recording of the information signal on the second area as a function of a recording position on the second recording disk in response to the evaluated test signal.

7. A recording method comprising the steps of:

recording a test signal on a recording area of a first recording disk according to a constant linear velocity technique;

reproducing the test signal form the recording area of the first recording disk;

generating a tracking signal related to the recording area of the first recording disk during the reproduction of the test signal from the recording area of the first recording disk;

evaluating the generated tracking signal as a function of a radial recording position on the first recording disk;

recording an information signal on a recording area of a second recording disk having an inner portion and an outer portion, wherein a degree of deterioration in record quality in the outer portion is greater than a degree of deterioration in record quality in the inner portion, and wherein the inner portion occupies substantially 80% of a radial dimension of the recording area while the outer portion occupies substantially 20% of the radial dimension of the recording area;

recording the information signal on the inner portion according to a constant linear velocity technique during the recording of the information signal on the recording area of the second recording disk;

decreasing a recording density in the recording of the information signal on the outer portion below a recording density in the recording of the information signal on the inner portion as a function of a recording portion on the second recording disk in response to the evaluated generated tracking signal.

8. A method comprising the steps of:

recording a test signal on a first recording disk according to a constant linear velocity technique;

reproducing the test signal from the first recording disk;

generating a tracking signal related to the first recording disk during the reproduction of the test signal from the first recording disk;

evaluating the generated tracking signal as a function of a recording position on the first recording disk;

recording an information signal on a second recording disk having a first and second areas, wherein a degree of deterioration in record quality in the first area is greater than a degree of deterioration in the second area;

recording the information signal on the first area according to a constant angular velocity technique during the recording of the information signal on the second recording disk;

decreasing a recording density of the information signal on the first area below a recording density of the information signal on the second area as a function of a recording position on the second recording disk in response to the evaluated generated tracking signal.

9. A recording apparatus comprising:

means for recording a test signal on a first recording disk according to a constant linear velocity technique;

means for reproducing the test signal from the first recording disk;

means for measuring a quality of the reproduced test signal as a function of a recording position on the first recording disk;

means for recording an information signal on a second recording disk at a selectable linear velocity; and means for controlling the adjustable linear velocity as a function of a recording position on the second recording disk in response to the measured quality during the recording of the information signal on the second recording disk.

10. A recording apparatus comprising:

means for recording a test signal on a first recording disk according to a constant linear velocity technique;

means for reproducing the test signal from the first recording disk;

means for evaluating the reproduced test signal as a function of a recording position on the first recording disk;

means for recording an information signal on a second recording disk having first and second areas, wherein a degree of deterioration in record quality in the first area is greater than a degree of deterioration in record quality in the second area;

means for decreasing a recording density during recording of the information signal on the first area below a recording density during recording of the information signal on the second area as a function of a recording position on the second recording disk in response to the evaluated quality.

* * * * *